(12) United States Patent
Ono et al.

(10) Patent No.: US 10,095,579 B2
(45) Date of Patent: Oct. 9, 2018

(54) SYSTEM, METHOD, AND COMPUTER PROGRAM FOR PROTECTING DATA IN PERSISTENT MEMORY

(71) Applicant: Lenovo Enterprise Solutions (Singapore) Pte. Ltd., Singapore (SG)

(72) Inventors: Makoto Ono, Chapel Hill, NC (US); Sumeet Kochar, Cary, NC (US); Nagananda Chumbalkar, Raleigh, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 154 days.

(21) Appl. No.: 15/197,566

(22) Filed: Jun. 29, 2016

(65) Prior Publication Data

US 2018/0004610 A1 Jan. 4, 2018

(51) Int. Cl.
*G06F 11/10* (2006.01)
(52) U.S. Cl.
CPC ................. *G06F 11/1092* (2013.01)
(58) Field of Classification Search
CPC ..................... G06F 11/1076–11/1096
See application file for complete search history.

(56) References Cited

U.S. PATENT DOCUMENTS

| 5,463,643 A * | 10/1995 | Gaskins | G06F 11/1008 710/1 |
| 5,469,566 A * | 11/1995 | Hohenstein | G06F 11/1076 711/114 |
| 7,028,213 B2 * | 4/2006 | Majni | G06F 11/108 714/42 |
| 9,529,670 B2 * | 12/2016 | O'Connor | G06F 11/1076 |
| 2014/0063983 A1 * | 3/2014 | Daly | G11C 7/1006 365/189.011 |
| 2016/0306723 A1 * | 10/2016 | Lu | G06F 11/2094 |

* cited by examiner

*Primary Examiner* — Joseph R Kudirka
(74) *Attorney, Agent, or Firm* — Zilka-Kotab, P.C.

(57) ABSTRACT

According to one embodiment, a computer program embodied on a tangible computer readable medium includes computer code for identifying a first write to a first persistent memory on a first channel and a second write to a second persistent memory on a second channel, computer code for performing a third write to a third persistent memory on a third channel, where the third write includes parity data associated with the first write and the second write, computer code for identifying a failure of the second persistent memory, and computer code for generating recovery data for the second persistent memory, using the first channel, the third channel, and the parity data.

18 Claims, 5 Drawing Sheets

SYSTEM, METHOD, AND COMPUTER PROGRAM FOR PROTECTING DATA IN PERSISTENT MEMORY

FIELD OF THE INVENTION

The present invention relates to persistent memory usage, and more particularly to protecting data in persistent memory.

BACKGROUND

Persistent memory is becoming an important attribute of server architectures. As a result, the introduction of persistent memory in the server segment has made protecting data in persistent memory an important objective, since server and application software both assume data availability. However, current server memory architectures are not designed to provide protection in case of failure of persistent memory devices. Further, due to memory interleaving, failure of one device may lead to loss of data across multiple devices. It is therefore desirable to implement data protection in persistent memory.

SUMMARY

According to one embodiment, a computer program embodied on a tangible computer readable medium includes computer code for identifying a first write to a first persistent memory on a first channel and a second write to a second persistent memory on a second channel, computer code for performing a third write to a third persistent memory on a third channel, where the third write includes parity data associated with the first write and the second write, computer code for identifying a failure of the second persistent memory, and computer code for generating recovery data for the second persistent memory, using the first channel, the third channel, and the parity data.

A method according to another embodiment includes identifying a first write to a first persistent memory on a first channel and a second write to a second persistent memory on a second channel, performing a third write to a third persistent memory on a third channel, where the third write includes parity data associated with the first write and the second write, identifying a failure of the second persistent memory, and generating recovery data for the second persistent memory, using the first channel, the third channel, and the parity data.

A system according to another embodiment includes a processor and logic integrated with and/or executable by the processor, the logic being configured to identify a first write of first data to a first persistent memory on a first channel and a second write of second data to a second persistent memory on a second channel, generate a parity block by performing an XOR operation on the first data and the second data, perform a third write of the parity block to a third persistent memory on a third channel, identify a failure of the second persistent memory, and recreate the second data, using the first data, the parity block, and the XOR operation.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and"the," include plural referents unless otherwise specified.

Figure 1:
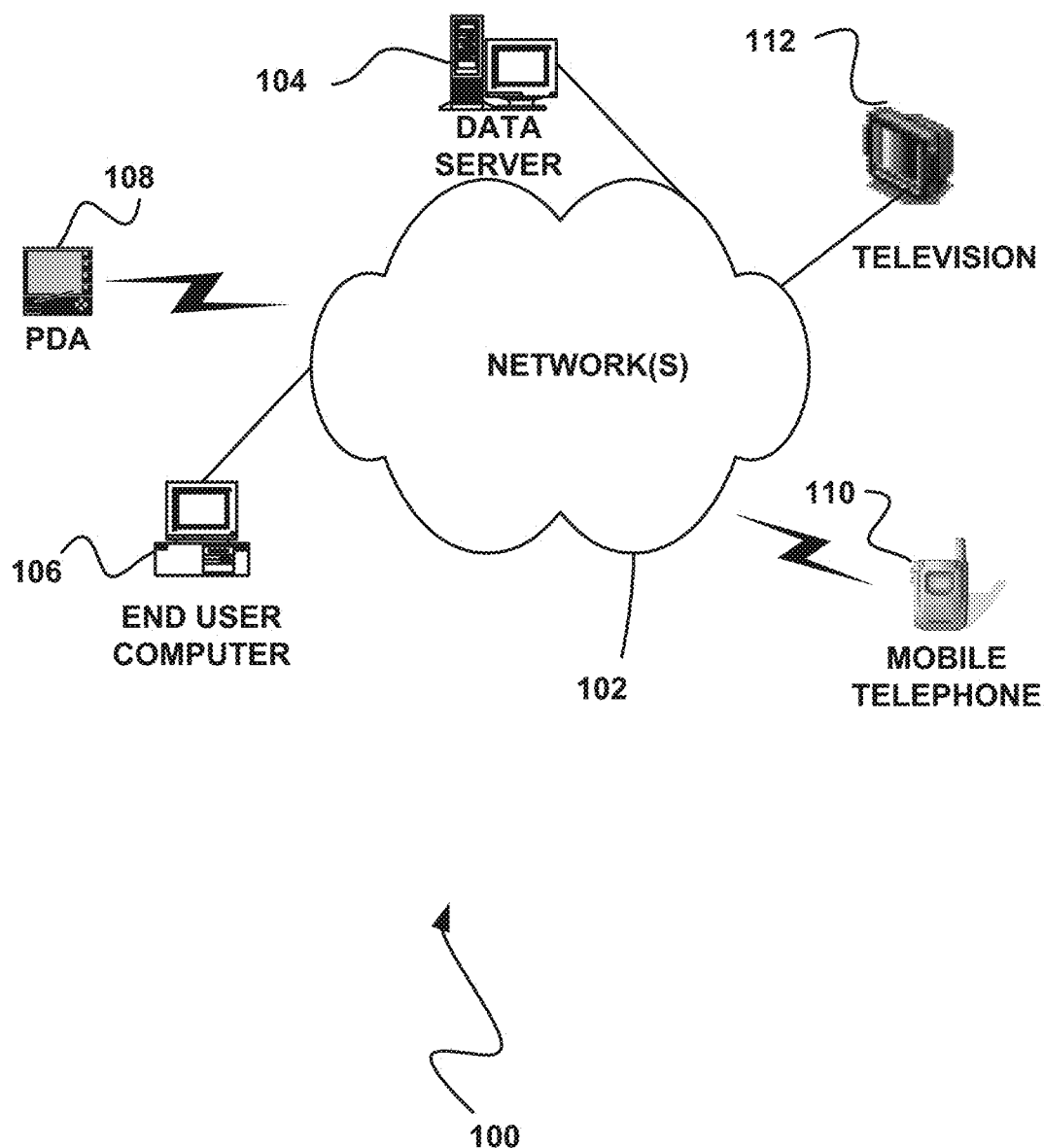
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
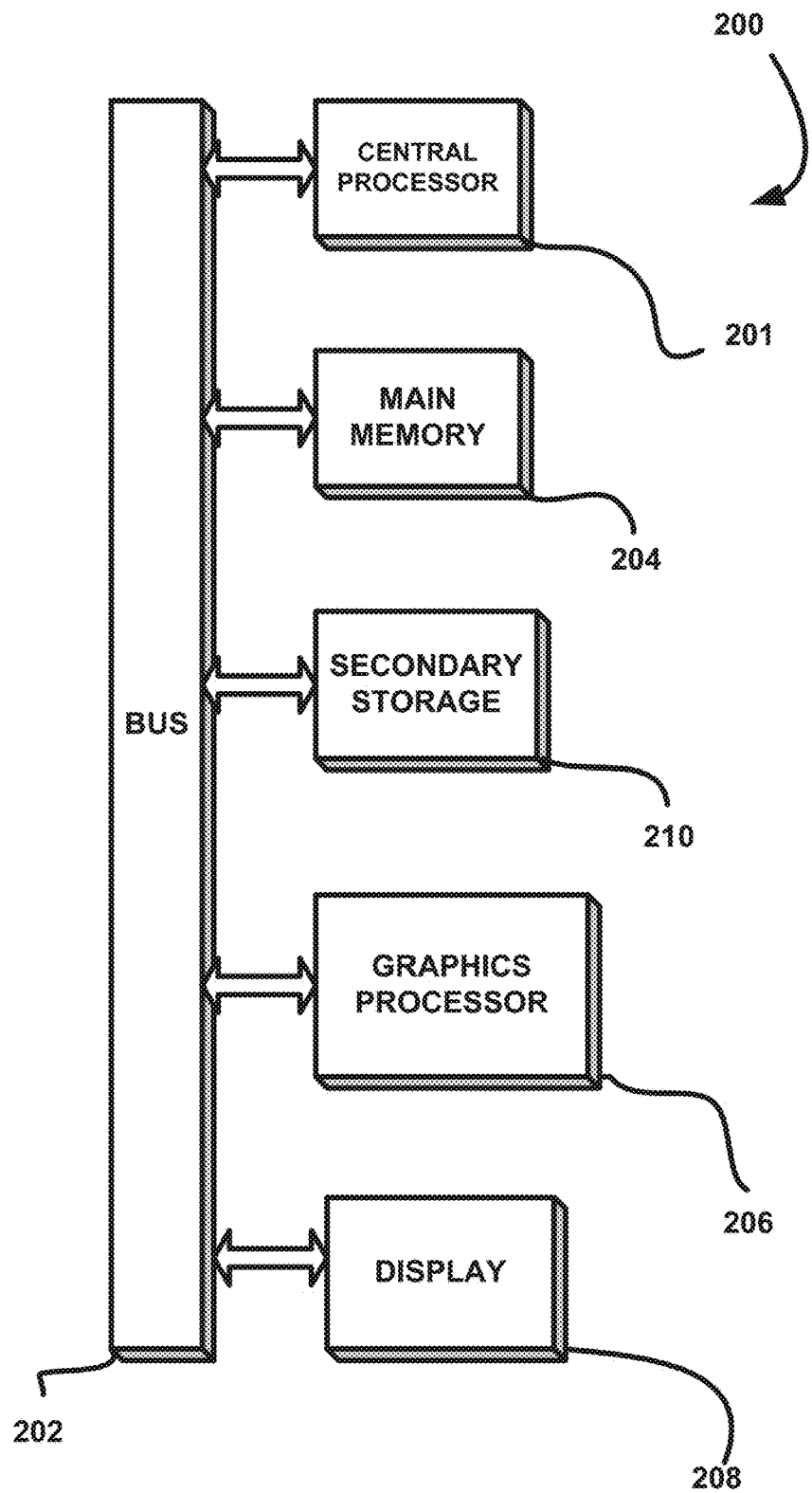
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210, volatile or non-volatile storage, and/or any other type of storage are possible examples of non-transitory computer-readable media.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Figure 3:
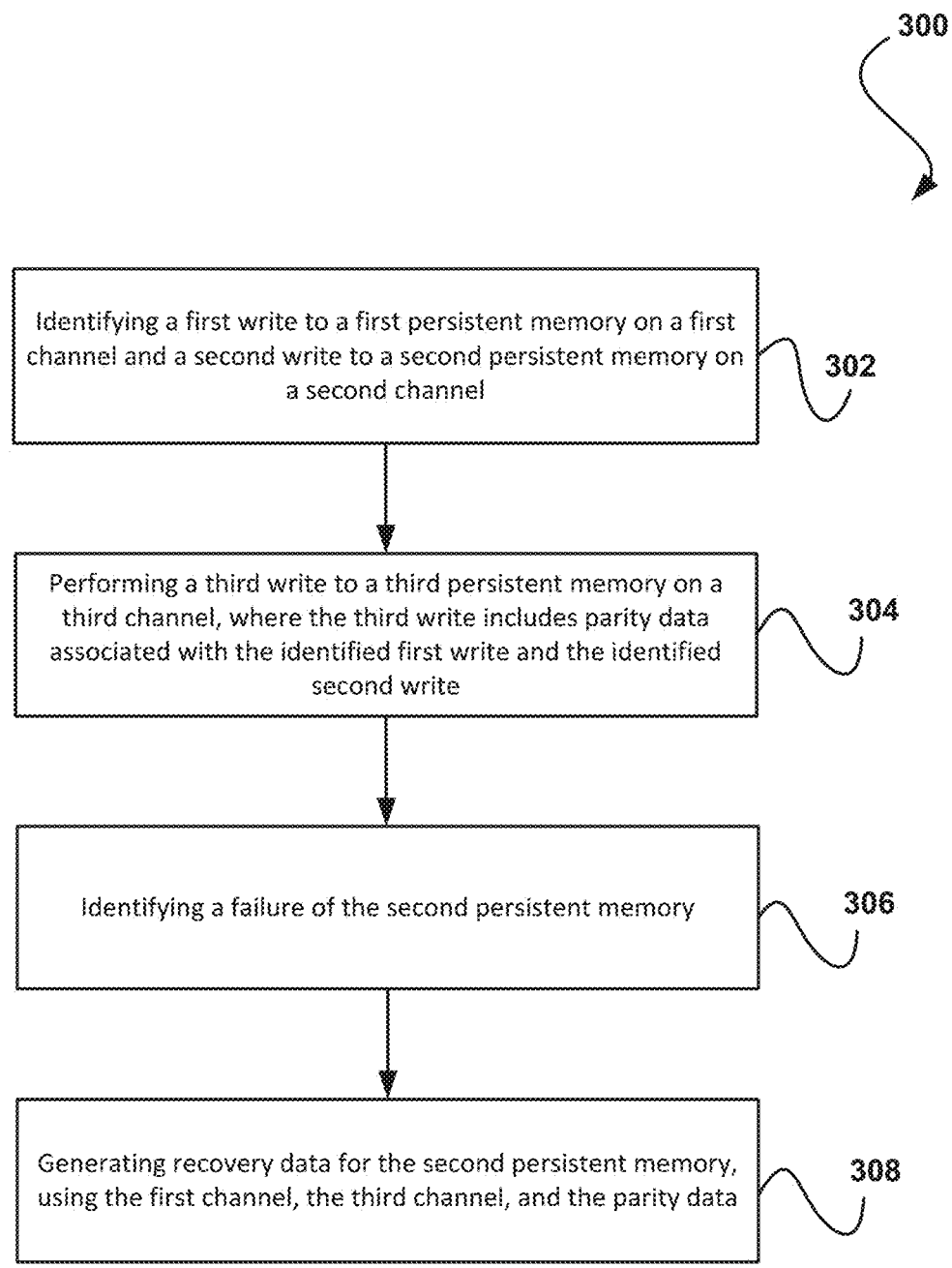
FIG. 3 illustrates a method for protecting data in persistent memory, in accordance with one embodiment.

FIG. 3 illustrates a method 300 for controlling configuration implementation, in accordance with one embodiment. As an option, the method 300 may be carried out in the context of the details of FIGS. 1-2 and 4-5. Of course, however, the method 300 may be carried out in any desired environment. Further, the aforementioned definitions may equally apply to the description below.

Each of the steps of the method 300 may be performed by any suitable component of the operating environment. For example, in various embodiments, the method 300 may be partially or entirely performed by a computer, server, storage controller, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in operation 302, a first write to a first persistent memory on a first channel and a second write to a second persistent memory on a second channel are identified. In one embodiment, the first channel and the second channel may include interleaved memory channels. For example, the first channel and the second channel may include memory channels that are configured in an interleave mode. In another embodiment, the first persistent memory and the second persistent memory may be included within a computing device. For example, the first persistent memory and the second persistent memory may be included within a server.

Additionally, in one embodiment, each write (e.g., each of the first write and the second write, etc.) may include a plurality of components. For example, each write may include a command (e.g., a write command), an address (e.g., a memory address), and data (e.g., data to be written) for each channel. In another embodiment, each write may be sent from a central processing unit (CPU). For example, each write may be sent from a CPU of a server to persistent memory of the server.

Further, in one embodiment, the first write and second write may be identified from within the CPU. For example, the first write and second write may be identified by logic (e.g., persistent memory protection logic, etc.) within the CPU that runs across multiple memory controllers within the CPU. In another embodiment, the first write and second write may be identified from outside of the CPU. For example, the first write and second write may be identified by logic (e.g., persistent memory protection logic, etc.) implemented outside of the CPU (e.g., on a third channel between a third persistent memory and a memory controller of a CPU, etc.).

Further still, in one embodiment, the first write and second write may be identified by snooping the first and second channels by logic outside of the CPU. For example, logic implemented outside of the CPU may include a plurality of DDR4 channels that snoop operations being performed on the first channel and the second channel.

Also, as shown in operation 304, a third write to a third persistent memory is performed on a third channel, where the third write includes parity data associated with the identified first write and identified second write. In one embodiment, the third write may include a command (e.g., the identified write command from the first write on the first channel), an address (e.g., the first address from the first write on the first channel), and the parity data (e.g., a parity block generated by performing an XOR of the first data to be written in the first write and the second data to be written in the second write).

In addition, in one embodiment, the third write to the third persistent memory may be performed by the logic that identified the first write and the second write. For example, the logic may be implemented on the third channel and may perform the third write to the third persistent memory on the third channel.

Furthermore, as shown in operation 306, a failure of the second persistent memory is identified. In one embodiment, the failure of the second persistent memory may be identified in response to a request for data from the second persistent memory. For example, the failure of the second persistent memory may be identified by the logic that identified the first write and the second write in response to a request for data sent from the CPU to the second persistent memory via the second channel.

Further still, in one embodiment, the failure of the second persistent memory may include an electrical issue associated with the second persistent memory. In another embodiment, the failure of the second persistent memory may include a physical failure of the second persistent memory. In yet another embodiment, the failure of the second persistent memory may include an error in a transmission of data from the second persistent memory. Of course, however, the failure of the second persistent memory may be caused by any of a plurality of circumstances.

Also, as shown in operation 308, recovery data is generated for the second persistent memory, using the first channel, the third channel, and the parity data. In one embodiment, generating the recovery data may include reading from the first persistent memory the first data at the first address (e.g., memory address, etc.) included within the first write on the first channel. In another embodiment, generating the recovery data may include reading from the third persistent memory the parity data at the first address from the third write on the third channel.

Additionally, in one embodiment, generating the recovery data may include recreating the second data using the first data and the parity data (e.g., using an XOR operation, etc.), where the recovery data includes the second data. In another embodiment, the recovery data may be sent a replacement memory (e.g., a persistent memory that replaced the failed second persistent memory, etc.) via the second channel. In yet another embodiment, the recovery data may be returned to the CPU via the second channel in response to a request for the second data from the CPU. Further, in one embodiment, the recovery data may be generated and sent by the logic that identified the first write and the second write.

Further, in one embodiment, a failure of the first persistent memory may be identified. In response, recovery data may be generated for the first persistent memory, using the second channel, the third channel, and the parity data. For example, generating the recovery data may include reading from the second persistent memory the second data at the second address (e.g., memory address, etc.) included within the second write on the second channel. In another embodiment, generating the recovery data may include reading from the third persistent memory the parity data at the first address from the third write on the third channel.

Additionally, in another example, when the first memory has failed, generating the recovery data may include recreating the first data using the second data and the parity data (e.g., using an XOR operation, etc.), where the very data includes the first data. In another embodiment, the recovery data may be sent to a replacement memory (e.g., a persistent memory that replaced the failed first persistent memory, etc.) via the first channel. In yet another embodiment, the recovery data may be returned to the CPU via the first channel in response to a request for the first data from the CPU. Further, in one embodiment, the recovery data may be generated and sent by the logic that identified the first write and the second write.

In this way, data in the first persistent memory and the second persistent memory may be protected against loss when one of the persistent memories fails. Further, persistent memory protection may be provided while only necessitating 50% additional memory capacity (as opposed to 100% additional memory capacity when memory mirroring is used).

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
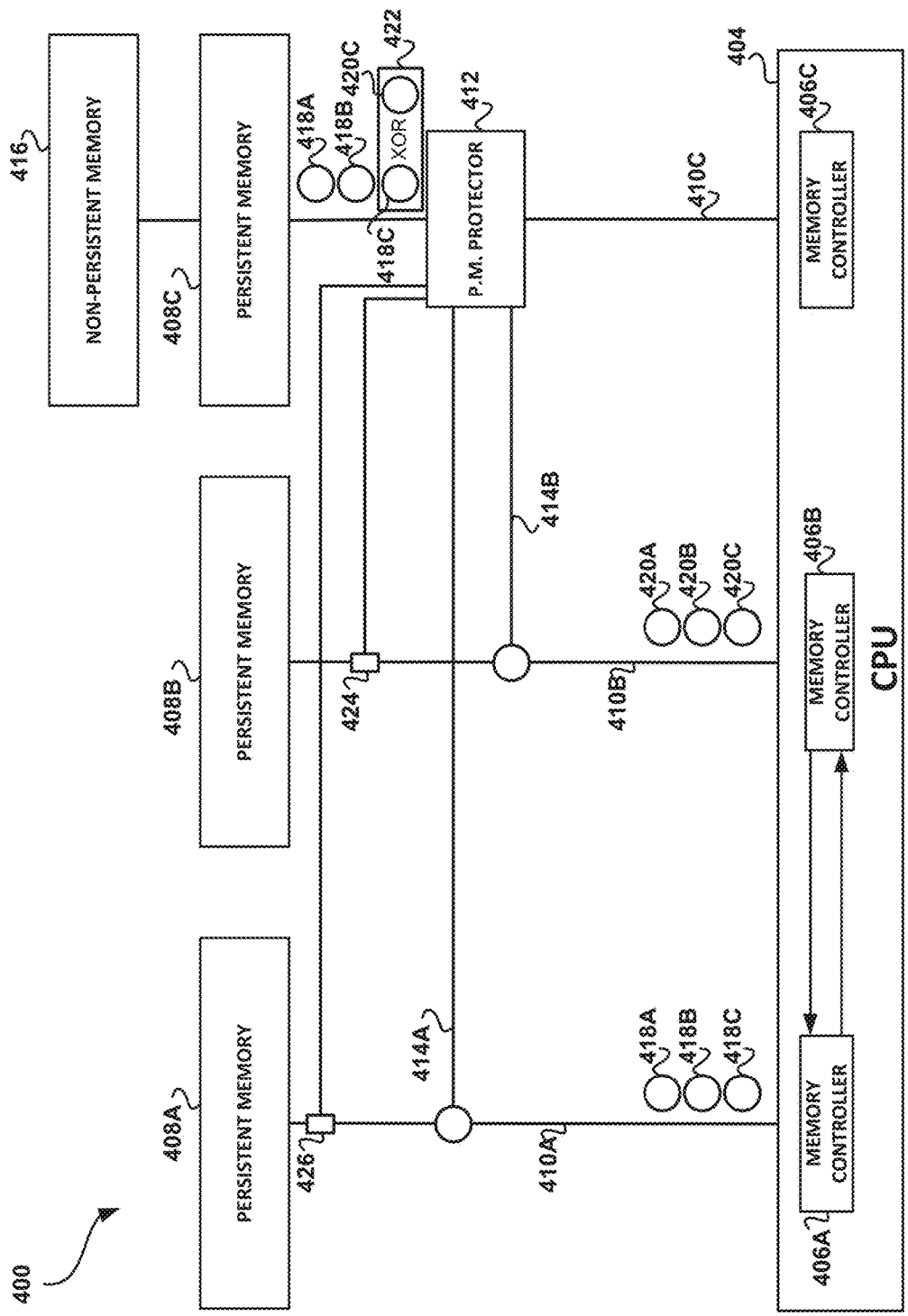
FIG. 4 illustrates an exemplary external persistent memory protection system, in accordance with one embodiment.

FIG. 4 illustrates an exemplary external persistent memory protection system 400, in accordance with one embodiment. As shown in FIG. 4, the exemplary persistent memory protection system 400 includes a CPU 404 having a plurality of memory controllers 406A-C, where memory controllers 406A and 406B are interleaved. For example, the CPU 404 may access content from the persistent memory 408A-B in an interleaved mode. Additionally, each of the plurality of memory controllers 406A-C is in communication with a respective persistent memory 408A-C via respective memory channels 410A-C, where memory channels 410A and 410B are interleaved.

Further, persistent memory protection logic 412 resides on memory channel 410C. In one embodiment, the memory channel 410C may be independent (e.g., may be configured in an independent mode, etc.). In another embodiment, the persistent memory protection logic 412 may be in communication with the persistent memory 408C via a separate channel connection.

Further still, persistent memory protection logic 412 is in communication with DDR4 memory channel 410A via a snooping channel 414A and is in communication with DDR4 memory channel 410B via a snooping channel 414B. Also, the CPU 404 may access non-persistent memory 416 via the third channel 410C. In one embodiment, the persistent memory protection logic 412 may include a field-programmable gate array (FPGA).

Additionally, in one embodiment, the memory controller 406A sends command 418A, address 418B, and data 418C to the persistent memory 408A via the memory channel 410A. This information is detected by the persistent memory protection logic 412 by snooping on the DDR4 memory channel 410A via the snooping channel 414A. In another embodiment, the memory controller 406B sends command 420A, address 420B, and data 420C to the persistent memory 408B via the memory channel 410B. This information is detected by the persistent memory protection logic 412 by snooping on the DDR4 memory channel 410B via the snooping channel 414B.

Further, in one embodiment, address 418B may be correlated to address 420B. For example, since memory controllers 406A and 406B as well as memory channels 410A and 410B are interleaved, address 420B may be an incremental increase of address 418B. In another embodiment, the data 418C may be stored at the address 418B within the persistent memory 408A (e.g., when command 418A is a write command), and the data 420C may be stored at the address 420B within the persistent memory 408B (e.g., when command 420A is a write command).

Further still, in one embodiment, at least a portion of the information snooped by the persistent memory protection logic 412 may be sent to the persistent memory 408C via the memory channel 410C. For example, the command 418A, the address 418B, and a parity block 422 created by the persistent memory protection logic 412 are sent to and stored at the persistent memory 408C. In another example, the parity block 422 is created by calculating an XOR of the data 418C and the data 420C. In another embodiment, the command 418A, the address 418B, and a parity block 422 created by the persistent memory protection logic 412 may be sent to and stored at the persistent memory 408C in response to a determination by the persistent memory protection logic 412 that one or more of the command 418A and 418B is a write command.

Also, in one embodiment, when it is determined by the persistent memory protection logic 412 that one or more of the command 418A and 418B is a read command, the persistent memory protection logic 412 may ignore data associated with the commands 418A and 418B being sent on memory channels 410A and 410B, and the persistent memory 408C may not return any data.

In addition, in one embodiment, when it is determined that persistent memory 408A or persistent memory 408B fails, the exemplary persistent memory protection system 400 may hang. In another embodiment, in response to such memory failure, content on the failed memory may be recovered. For example, it may be determined that the persistent memory 408B has failed. In another example, in response to such failure, the persistent memory 408B may be replaced with a replacement persistent memory.

Further, in one example, the persistent memory protection logic 412 may be informed of the failure of persistent memory 408B and may be set into a data reconstruction mode in response to such failure. In another example, all channels 410A-C may be configured to an independent mode (e.g., not an interleaved mode, etc.) in response to such failure. In yet another example, the address 418B may be read from persistent memory 408A via memory channel 410A to obtain data 418C, and the address 418B may be read from persistent memory 408C via memory channel 410C to obtain parity block 422. In one embodiment, these reads may be requested by the CPU 404.

Further still, in one example, the persistent memory protection logic 412 may obtain the data 418C by snooping on the DDR4 memory channel 410A via the snooping channel 414A. In another example, the persistent memory protection logic 412 may then generate the data 420C (in this case, the data lost on the failed memory) utilizing the data 418C and the parity block 422 obtained from the memory channel 410C. For instance, the data 420C may be obtained by performing an XOR on the data 418C and the parity block 422.

Also, in one example, the generated data 420C may then be sent to the replacement persistent memory (e.g., the memory replacing the failed persistent memory 408B) via the memory channel 410B. In one embodiment, the generated data 420C may be sent by the persistent memory protection logic 412 via the snooping channel 414B onto the memory channel 410B. In another embodiment, the generated data 420C may be sent to the memory controller 406C of the CPU 404 by the persistent memory protection logic 412 via the memory channel 410B, and then may be sent to the replacement persistent memory by the memory controller 406B of the CPU 404 via the memory channel 410B. In yet another embodiment, the above recovery actions may be performed for an entire address range that is needed to be restored to the replacement persistent memory.

Additionally, in one embodiment, run time recovery may be supported by the persistent memory protection logic 412. For example, the persistent memory protection logic 412 may be informed of the failure of persistent memory 408A or 408B and may be set into a recovery mode in response to such failure. In recovery mode, the persistent memory protection logic 412 may institute a block 426 on memory channel 410A when it is determined that persistent memory 408A has failed, and the persistent memory protection logic 412 may institute a block 424 on memory channel 410B when it is determined that persistent memory 408B has failed.

Further, in one embodiment, when it is determined that persistent memory 408A has failed, the persistent memory protection logic 412 may detect data requests to such memory 408A via the memory channel 410A by snooping on the DDR4 memory channel 410A via the snooping channel 414A. In another embodiment, when it is determined that persistent memory 408B has failed, the persistent memory protection logic 412 may detect data requests to such memory 408B via the memory channel 410B by snooping on the DDR4 memory channel 410B via the snooping channel 414B.

Further still, the data requested from the failed memory may then be generated by the persistent memory protection logic 412 using address data and parity data in the manner shown hereinabove, and may be returned to the requesting memory controller 406A or 406B via respective snooping channel 414A-B and memory channel 410A-B.

In this way, persistent memory 408A and 408B may be used for data storage, and persistent memory 408C may be used for storing parity data to be used for data recovery by the persistent memory protection logic 412 in case of a failure.

Figure 5:
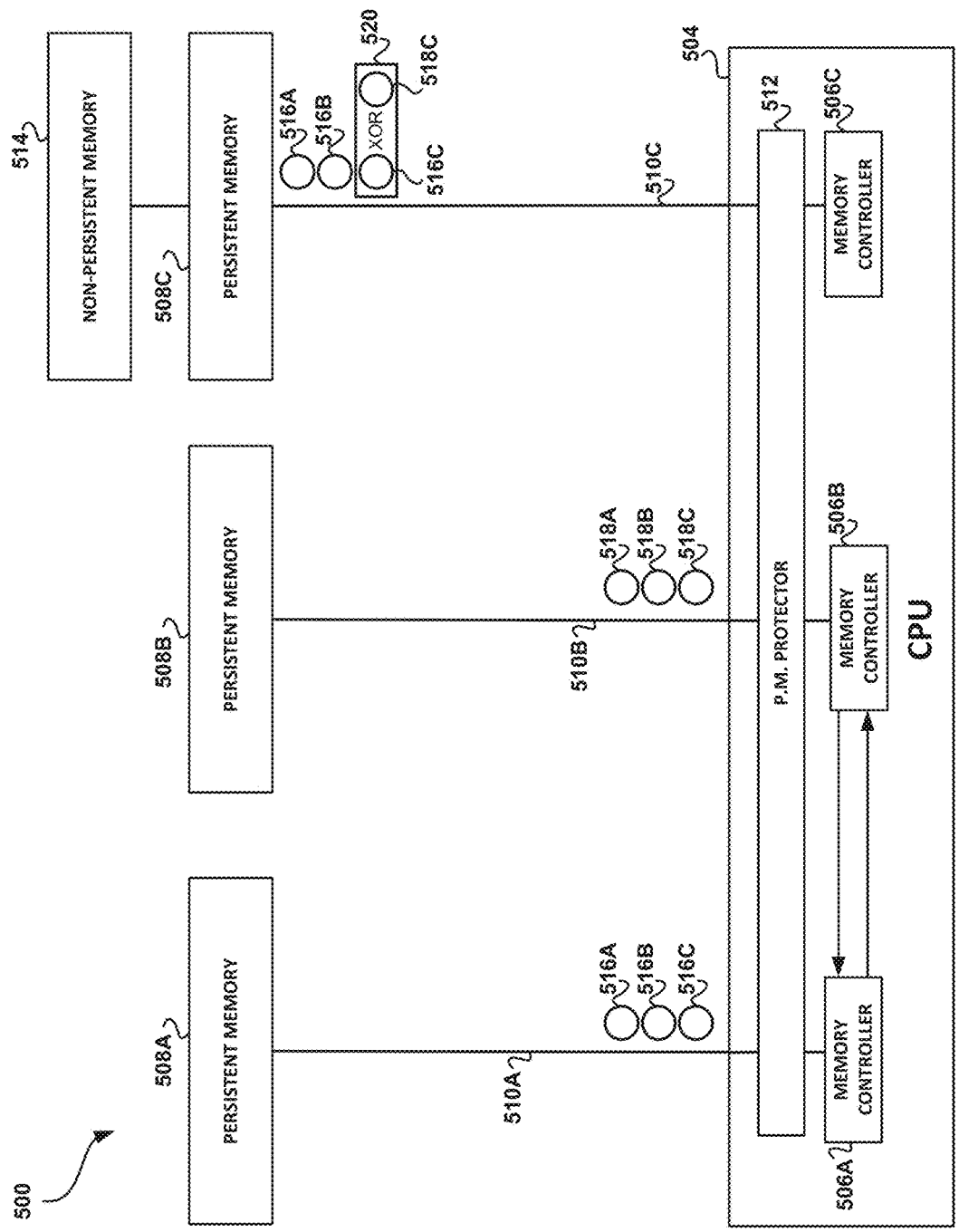
FIG. 5 illustrates an exemplary integrated persistent memory protection system, in accordance with one embodiment.

FIG. 5 illustrates an exemplary integrated persistent memory protection system 500, in accordance with one embodiment. As shown in FIG. 5, the exemplary persistent memory protection system 500 includes a CPU 504 having a plurality of memory controllers 506A-C, where memory controllers 506A and 506B are interleaved. For example, the CPU 504 may access content from the persistent memory 508A-B in an interleaved mode. Additionally, each of the plurality of memory controllers 506A-C is in communication with a respective persistent memory 508A-C via respective memory channels 510A-C, where memory channels 510A and 510B are interleaved.

Further, persistent memory protection logic 512 is implemented within CPU 504 across memory controllers 506A-C and in communication with memory channels 510A-C. In one embodiment, the memory channel 510C may be independent (e.g., may be configured in an independent mode, etc.). Also, the CPU 504 may access non-persistent memory 514 via the third channel 510C. In one embodiment, the persistent memory protection logic 512 may include a field-programmable gate array (FPGA).

Additionally, in one embodiment, the memory controller 506A sends command 516A, address 516B, and data 516C to the persistent memory 508A via the memory channel 510A. This information is detected by the persistent memory protection logic 512 via the memory channel 510A. In another embodiment, the memory controller 506B sends command 518A, address 518B, and data 518C to the persistent memory 508B via the memory channel 510B. This information is detected by the persistent memory protection logic 512 via the memory channel 510B.

Further, in one embodiment, address 516B may be correlated to address 518B. For example, since memory controllers 506A and 506B as well as memory channels 510A and 510B are interleaved, address 518B may be an incremental increase of address 516B. In another embodiment, the data 516C may be stored at the address 516B within the persistent memory 508A (e.g., when command 516A is a write command), and the data 518C may be stored at the address 518B within the persistent memory 508B (e.g., when command 518A is a write command).

Further still, in one embodiment, at least a portion of the information sent by the memory controller 506A and 506B may be sent to the persistent memory 508C via the memory channel 510C. For example, the command 516A, the address 516B, and a parity block 520 created by the persistent memory protection logic 512 are sent to and stored at the persistent memory 508C. In another example, the parity block 520 is created by calculating an XOR of the data 516C and the data 518C. In another embodiment, the command 516A, the address 516B, and a parity block 520 created by the persistent memory protection logic 512 may be sent to and stored at the persistent memory 508C in response to a determination by the persistent memory protection logic 512 that one or more of the command 516A and 516B is a write command.

Also, in one embodiment, when it is determined by the persistent memory protection logic 512 that one or more of the command 516A and 516B is a read command, the persistent memory protection logic 512 may ignore data associated with the commands 516A and 516B being sent on memory channels 510A and 510B, and the persistent memory 508C may not return any data.

In addition, in one embodiment, when it is determined that persistent memory 508A or persistent memory 508B fails, the exemplary persistent memory protection system 500 may hang. In another embodiment, in response to such memory failure, content on the failed memory may be recovered. For example, it may be determined that the persistent memory 508B has failed. In another example, in response to such failure, the persistent memory 508B may be replaced with a replacement persistent memory.

Further, in one example, the persistent memory protection logic 512 may be informed of the failure of persistent memory 508B and may be set into a data reconstruction mode in response to such failure. In another example, all channels 510A-C may be configured to an independent mode (e.g., not an interleaved mode, etc.) in response to such failure. In yet another example, the address 516B may be read from persistent memory 508A via memory channel 510A to obtain data 516C, and the address 516B may be read from persistent memory 508C via memory channel 510C to obtain parity block 520. In one embodiment, these reads may be requested by the CPU 504.

Further still, in one example, the persistent memory protection logic 512 may obtain the data 516C from the memory channel 510A. In another example, the persistent memory protection logic 512 may then generate the data 518C (in this case, the data lost on the failed memory) utilizing the data 516C and the parity block 520 obtained from the memory channel 510C. For instance, the data 518C may be obtained by performing an XOR on the data 516C and the parity block 520.

Also, in one example, the generated data 518C may then be sent to the replacement persistent memory (e.g., the memory replacing the failed persistent memory 508B) via the memory channel 510B. In one embodiment, the generated data 518C may be sent by the persistent memory protection logic 512 via the memory channel 510B. In yet another embodiment, the above recovery actions may be performed for an entire address range that is needed to be restored to the replacement persistent memory.

Additionally, in one embodiment, run time recovery may be supported by the persistent memory protection logic 512. For example, the persistent memory protection logic 512 may be informed of the failure of persistent memory 508A or 508B and may be set into a recovery mode in response to such failure. In recovery mode, the persistent memory protection logic 512 may block memory channel 510A when it is determined that persistent memory 508A has failed, and the persistent memory protection logic 512 may block memory channel 510B when it is determined that persistent memory 508B has failed.

Further, in one embodiment, when it is determined that persistent memory 508A has failed, the persistent memory protection logic 512 may detect data requests to such memory 508A. In another embodiment, when it is determined that persistent memory 508B has failed, the persistent memory protection logic 512 may detect data requests to such memory 508B. Further still, the data requested from the failed memory may then be generated by the persistent memory protection logic 512 using address data and parity data in the manner shown hereinabove, and may be returned to the requesting memory controller 506A or 506B.

In this way, persistent memory 508A and 508B may be used for data storage, and persistent memory 508C may be used for storing parity data to be used for data recovery by the persistent memory protection logic 512 in case of a failure.

It will be clear that the various features of the foregoing systems and/or methodologies may be combined in any way, creating a plurality of combinations from the descriptions presented above.

While various embodiments have been described above, it should be understood that they have been presented by way of example only, and not limitation. Thus the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising:
    computer code for identifying a first write to a first persistent memory on a first channel and a second write to a second persistent memory on a second channel, where:
        persistent memory protection logic utilizes a first snooping channel to identify the first write to the first persistent memory on the first channel,
        the second channel is separate from the first channel, and
        the persistent memory protection logic utilizes a second snooping channel separate from the first snooping channel to identify the second write to the second persistent memory on the second channel;
    computer code for performing a third write to a third persistent memory on a third channel, where the third write includes parity data associated with the first write and the second write, and where the third channel is separate from the first channel and the second channel;
    computer code for identifying a failure of the second persistent memory;
    computer code for generating recovery data for the second persistent memory, using the first channel, the third channel, and the parity data; and
    computer code for sending the recovery data for the second persistent memory to a replacement memory that replaced the second persistent memory, using the second channel.

2. The computer program of claim 1, wherein the first channel and the second channel include interleaved DDR4 memory channels.

3. The computer program of claim 1, wherein the first write and the second write are identified by persistent memory protection logic within a central processing unit (CPU) that runs across multiple memory controllers within the CPU.

4. The computer program of claim 1, wherein the first write and second write are identified by persistent memory protection logic implemented outside of a central processing unit (CPU) on the third channel between the third persistent memory and a memory controller of the CPU.

5. The computer program of claim 1, wherein the first write and second write are identified by snooping the first and second channels.

6. The computer program of claim 1, wherein:
the first write includes a first write command, a first memory address, and first data to be written at the first memory address,
the second write includes a second write command, a second memory address, and second data to be written at the second memory address, and
the third write includes the first write command, the first memory address, and parity data generated by performing an XOR operation on the first data to be written and the second data to be written, and
generating the recovery data for the second persistent memory includes:
reading, from the first memory address at the first persistent memory, the first data,
reading, from first memory address at the third persistent memory, the parity data, and
performing the XOR operation on the first data and the parity data to generate the recovery data for the second persistent memory.

7. The computer program of claim 1, wherein the persistent memory protection logic includes a field-programmable gate array (FPGA).

8. The computer program of claim 1, further comprising computer code for changing a configuration of the first channel, the second channel, and the third channel from interleaved to independent, in response to the failure of the second persistent memory.

9. A method, comprising:
identifying a first write to a first persistent memory on a first channel and a second write to a second persistent memory on a second channel, where:
persistent memory protection logic utilizes a first snooping channel to identify the first write to the first persistent memory on the first channel,
the second channel is separate from the first channel, and
the persistent memory protection logic utilizes a second snooping channel separate from the first snooping channel to identify the second write to the second persistent memory on the second channel;
performing a third write to a third persistent memory on a third channel, where the third write includes parity data associated with the first write and the second write, and where the third channel is separate from the first channel and the second channel;
identifying a failure of the second persistent memory;
generating recovery data for the second persistent memory, using the first channel, the third channel, and the parity data; and
sending the recovery data for the second persistent memory to a replacement memory that replaced the second persistent memory, using the second channel.

10. The method of claim 9, wherein the first channel and the second channel include interleaved DDR4 memory channels.

11. The method of claim 9, wherein the first write and the second write are identified by persistent memory protection logic within a central processing unit (CPU) that runs across multiple memory controllers within the CPU.

12. The method of claim 9, wherein the first write and second write are identified by persistent memory protection logic implemented outside of a central processing unit (CPU) on the third channel between the third persistent memory and a memory controller of the CPU.

13. The method of claim 9, wherein the first write and second write are identified by snooping the first and second channels.

14. The method of claim 9, wherein:
the first write includes a first write command, a first memory address, and first data to be written at the first memory address,
the second write includes a second write command, a second memory address, and second data to be written at the second memory address, and
the third write includes the first write command, the first memory address, and parity data generated by performing an XOR operation on the first data to be written and the second data to be written, and
generating the recovery data for the second persistent memory includes:
reading, from the first memory address at the first persistent memory, the first data,
reading, from first memory address at the third persistent memory, the parity data, and
performing the XOR operation on the first data and the parity data to generate the recovery data for the second persistent memory.

15. The method of claim 14, wherein the persistent memory protection logic includes a field-programmable gate array (FPGA).

16. The method of claim 9, further comprising computer code for changing a configuration of the first channel, the second channel, and the third channel from interleaved to independent, in response to the failure of the second persistent memory.

17. A system, comprising:
a processor and logic integrated with and/or executable by the processor, the logic being configured to:
identify a first write of first data to a first persistent memory on a first channel and a second write of second data to a second persistent memory on a second channel, where:
persistent memory protection logic utilizes a first snooping channel to identify the first write to the first persistent memory on the first channel,
the second channel is separate from the first channel, and
the persistent memory protection logic utilizes a second snooping channel separate from the first snooping channel to identify the second write to the second persistent memory on the second channel;
generate a parity block by performing an XOR operation on the first data and the second data;
perform a third write of the parity block to a third persistent memory on a third channel, and where the third channel is separate from the first channel and the second channel;
identify a failure of the second persistent memory; and
recreate the second data as recovery data, using the first data, the parity block, and the XOR operation; and
send the recovery data for the second persistent memory to a replacement memory that replaced the second persistent memory, using the second channel.

18. The system of claim 17, wherein the processor is coupled to memory via a bus.

* * * * *